United States Patent Office 2,694,630
Patented Nov. 16, 1954

2,694,630

SIZED WATERLAID GLASS FIBER PRODUCTS AND PROCESS OF PREPARING THE SAME

Chester G. Landes, New Canaan, and Walter F. Reynolds, Jr., Stamford, Conn., assignors to American Cyanamid Company, New York, N. Y., a corporation of Maine No Drawing. Application May 31, 1952,
Serial No. 291,074

10 Claims. (Cl. 92—3)

This invention relates to the production of sized or water-repellent waterlaid fibrous products, including paper, hardboard, insulating board and the like, composed of or containing glass fibers having applied thereto a novel class of sizing agents. The invention includes the sized glass fiber-containing paper or other waterlaid products as well as their methods of production and the novel sizing agents applied thereto.

We have discovered a class of hydrophobic or water-repellent condensation products which are substantive to glass fibers; i. e. which, when added to a relatively dilute aqueous suspension containing glass fibers, will precipitate or deposit thereon in quantities sufficient to impart sizing and water repellency to paper and board subsequently made therefrom by conventional papermaking processes. The condensation products possessing these unusual and advantageous properties are the hereinafter defined higher aliphatic amine-epichlorhydrin condensation products which are applied in water-soluble or water-dispersible condition. After adsorbing the water-dispersed condensation products on the glass fibers, the treated fibers are formed into paper or board by any known or approved forming procedure; the resulting paper may be dried, with or without the incorporation of fillers or other materials, and with or without pressing or rolling into hardboard, insulating board or other forms or shapes.

The higher aliphatic amine-epichlorhydrin condensation products may be used either as such or as the hydrochloride, acetate or other water-soluble salt, as will be explained more fully hereinafter. Instead of epichlorhydrin, the corresponding epibromhydrin or iodhydrin may be used. In all cases the sizing action obtained is resistant to alkaline conditions; i. e., glass fiber paper and board sized therewith is not desized by the action of alkalies. On the contrary, in many cases the presence or addition of alkalies appears to fix the sizing agent even more firmly to the glass fibers and thus to enhance the water repellency and sizing action thereof. Usually quantities of from 0.1 to 1% up to 5% by weight of the condensation product are employed, based on the dry weight of the glass fiber. After the sizing agent is absorbed the fibers are formed into paper, board or other shapes and heated at the times and temperatures usually employed in paper mills for drying purposes; i. e., in the case of paper manufacture at about 105–150° C. for 0.5–3 minutes or longer, and during this heating the sizing properties of the condensation products are developed on the fibers.

The higher aliphatic amine-epichlorhydrin condensation products used in practicing the invention are obtained by heating either an aliphatic amine or a salt thereof with a quantity of epichlorhydrin sufficient to form a condensation product containing from 1 to 2 mols of combined epichlorhydrin for each mol of aliphatic amine. When epichlorhydrin and a free higher aliphatic amine are used the proper proportion of reagents to be mixed together is from equimolecular quantities up to slightly more than 2 mols of epichlorhydrin for each mol of amine. When amine salts are used the molar ratio of epichlorhydrin can be considerably higher, extending up to about 3:1. This difference appears to result from the fact that the amine salts do not react with epichlorhydrin as readily or as completely as do the free amines themselves; therefore, a larger proportion of epichlorhydrin may be used. The fact appears to be that no more than 2 mols of epichlorhydrin can be reacted with 1 mol of a higher aliphatic monoamine such as octadecylamine, regardless of the excess of epichlorhydrin in the reaction mixture; the unreacted epichlorhydrin appears to form glycerol dichlorhydrin that does not function as a sizing agent.

In general, therefore, the condensation products suitable for use in practicing the invention are those containing from 1 to 2 mols of epichlorhydrin condensed with 1 mol of higher aliphatic amine or amine mixture having an average molecular weight corresponding to a hydrocarbon chain length of from about 8 to 22 carbon atoms. The preferred aliphatic monoamines used are those of about 16–18 carbon atoms, since these are obtainable commercially at reasonably low cost. It will be understood that either alkyl amines (i. e., amines of saturated character) or alkenylamines (unsaturated amines) may be employed; however, it is preferred that at least 50% of the amine hydrocarbon be fully saturated.

In preparing the condensation products the amine is preferably dissolved in a solvent such as ethanol, propanol, butanol or the like, and the epichlorhydrin is added slowly at temperatures below about 90° C. After all the epichlorhydrin has been added the solution is heated until a water-soluble or water-dispersible condensation product is formed. The solvent can then be removed by distillation at reduced pressure and the sizing agent obtained as a waxy material. In carrying out the condensation, care should be taken to use relatively mild reaction conditions, such as temperatures not substantially higher than 100° C., and to stop the reaction when an initial condensation product has been formed. If the reaction is carried out for too long a time, or if excessively high temperatures are used, there is danger of forming a polymerized condensation product that has greatly reduced efficiency as a sizing agent and that is not readily dispersed in water.

The higher aliphatic amine-epichlorhydrin condensation products are applied to the glass fibers while the fibers are suspended in water and before they are formed into paper, board or other waterlaid product. In most cases a dilute aqueous suspension of the glass papermaking fibers is first prepared, usually at consistencies within the range of about 0.5–2% solids, and an aqueous dispersion of the condensation product is added thereto. The stock suspension may consist entirely of glass fibers, or it may be a mixture of glass fibers with papermaking fibers of other types, such as kraft pulp, sulfite pulp, groundwood pulp or other cellulosic papermaking fibers; cotton flocks, viscose or other regenerated cellulose threads, nylon fibers, and the like. It is an important advantage of the invention that the amine-epichlorhydrin condensation products are also substantive to cellulosic fibers, and therefore can be used to size mixed stock suspensions of the above described types; however, of course, similar results can be obtained by applying the sizing material separately to the glass fibers, in one suspension, and to the cellulosic fibers, in another suspension, and then mixing the two stock suspensions together.

Inasmuch as the condensation products employed are water-soluble or water-dispersible in the form of their acid salts, they are incorporated into the stock suspension under neutral or preferably under acid conditions. Experience has shown that the best results are obtained when pH values below 6 are used, and the preferred range is between about 4.5 and 5.5. After the sizing agent has been added and adsorbed, the stock should be made alkaline by the addition of alkalies such as caustic soda, lime, calcium carbonate and the like. A final pH of about 8 is sufficient; however the pH of the stock is preferably raised to 9–10 prior to the forming step. The stock is then made into paper by any suitable forming procedure, as on a Fourdrinier machine or on a cylinder machine, and the paper is heated in the usual manner to remove excess moisture. During this heating, which is usually carried out by passing the paper over or between steam-heated drying rolls having temperatures between 200° F.

and 300° F. for a time of about 0.5–3 minutes, the sizing properties of the condensation product are developed on the fibers and a well-sized paper is obtained.

A further important advantage of the novel sizing agents of the present invention resides in the improved results obtainable when they are applied along with starches, gums, wax sizes and other organic sizing or filling agents. It has been found that the addition of from 0.1% to 3% or more of these materials, along with from about 0.1% to 1.5% or more of the condensation products of the present invention, based on the dry weight of the fibers, results in still further improvements in water resistance, particularly in glass-wood fiber board made from 60–80% glass fibers and 40–20% groundwood or kraft cellulosic fibers. Suitable starches are corn starch, potato starch, wheat starch and the like. Locust bean gum and other mannogalactans, casein and other proteins and similar gums may be employed, preferably after solubilization with borax or other alkali. Any of the commercially available wax size emulsions may be employed.

The quantity of the new sizing agents to be employed depends on the type of paper or board being made, on the water resistance desired, and on the heating times and temperatures to be employed in drying the paper or board. It has been found that as little as 0.1% to 1% can be employed, based on the dry weight of the fibers, when glass fiber paper is dried by heating at 115–130° C. for from 1 to 2 minutes. Quantities of the sizing agent within the range of 0.5% to about 2% are recommended for most purposes. More than 5%, based on the dry weight of the paper pulp, does not seem to increase further the water resistance of glass-fiber paper, but may sometimes be useful in board manufacture. Any of the temperatures and times ordinarily used in paper mills to dry the paper from the forming machine, such as temperatures of 105° to 150° C. for 0.5 to 3 minutes may be employed; in hardboard manufacture platen temperatures up to 460–500° F. for as long as 20–30 minutes may be used.

The invention will be further described by the following specific examples. It should be understood, however, that although these examples may describe certain features of the invention in detail, they are given primarily for purposes of illustration and the invention in its broader aspects is not limited thereto.

*Example 1*

A solution of 103.7 grams (0.371 mol) of "Armeen D," a commercial octadecylamine having a molecular weight of 279.5, in 150 cc. of ethanol was converted into the hydrochloride by adding 13.7 grams (0.371 mol) of concentrated hydrochloric acid. The solution was heated to 70° C. and 68.6 grams (0.742 mol) of epichlorhydrin was added with cooling at the rate of about 5–8 cc. per minute while maintaining the temperature below 70° C. The mixture was then boiled under a reflux condenser for 4 hours, the solvent removed by distillation and the product was stripped under a partial vacuum. The residue was an opaque, dark brown soft wax containing 1.3 mols of combined epichlorhydrin for each mol of amine.

*Example 2*

A solution of 496 grams (1.84 mols) of octadecylamine in 700 cc. of ethanol was neutralized by adding 155 cc. (1.84 mols) of concentrated hydrochloric acid. It was then heated to 65° C. and 511 grams (5.52 mols) of epichlorhydrin was added during a 50 minute period at the rate of 5–8 cc. per minute. During this addition the reaction mixture was cooled to a maximum temperature of 74° C. Fifteen minutes after the addition was complete the solution was heated to boiling and refluxed 4 hours. After removing volatiles the condensation product was obtained as a light brown clear syrup which cooled to a soft tan paste.

*Example 3*

A. A condensation product was prepared from octadecylamine and epichlorhydrin in the molar ratio of 1:1.2. This was done by dissolving 146 grams (0.5 mol) of a commercial octadecylamine in 125 cc. of alcohol, heating to 65° C. and adding 55.5 grams (0.6 mol) of epichlorhydrin during 10 minutes, followed by boiling the mixture under a reflux condenser for 4 hours. The solvent was distilled and the residue stripped of volatiles by heating at reduced pressure, whereupon the solid condensation product was obtained as a light tan colored wax.

B. A similar condensation product was prepared by adding the epichlorhydrin to the octadecylamine solution in the molar ratio of 1.4:1. A solution of 146 grams of octadecylamine in 125 cc. of alcohol was used and 64.8 grams (0.7 mol) of epichlorhydrin was added during 15 minutes. The mixture was then refluxed 4 hours and stripped of solvents in the usual manner.

C. Following the same procedure, 146 grams (0.5 mol) of commercial octadecylamine was reacted with 83.2 grams (0.9 mol) of epichlorhydrin to form a condensation product.

D. A solution containing 146 grams (0.5 mol) of commercial octadecylamine in 150 cc. of ethanol was prepared and heated to 65° C. To this solution 92.5 grams (1 mol) of epichlorhydrin was added uniformly during 12 minutes, the temperature being maintained below 75° C. The resulting mixture was boiled 4 hours under a reflux condenser, the solvents removed by distillation at reduced pressure and the residue stripped of volatiles in the usual manner. There was obtained 223.2 grams of octadecylamine-epichlorhydrin condensation product as a light, brittle, tan colored wax.

E. A solution of 292 grams (1 mol) of commercial octadecylamine in 300 cc. of ethanol was prepared and 232 grams (2.5 mols) of epichlorhydrin were added over a 48 minute period. The mixture was refluxed 4 hours and stripped of solvent and volatiles in the usual manner.

*Example 4*

A solution of 110 grams (0.39 mol) of commercial octadecylamine in 150 cc. of ethanol was prepared and converted into the hydrochloride by adding 33 cc. (0.39 mol) of concentrated hydrochloric acid. The solution was then agitated at 70–78° C. while 109 grams (1.18 mols) of epichlorhydrin were added during 15 minutes. The solution was then refluxed 4 hours and the condensation product recovered as in Example 1.

*Example 5*

A condensation product of 1 mol of commercial octadecylamine with 1.4 mols of epichlorhydrin and 1 mol of acetic acid was prepared by the following procedure.

The epichlorhydrin was added gradually to the octadecylamine while maintaining the temperature of the mixture at 70°–80° C. When the mixture was complete it was held at 80° C. for 30 minutes, after which the acetic acid (as glacial acetic acid) was added and allowed to react for 15–20 minutes. The material was then poured into trays.

This condensation product is dispersible in hot (190° F.) water. It is most readily dissolved by adding 5 pounds for each 100 pounds of water with continuous agitation and, when completely dispersed, cooling to room temperature.

*Example 6*

Glass fiber stock of 0.5 to 0.75 micron diameter was suspended in water and circulated for one hour in a beater with the roll up. The resulting suspension of short glass fibers was separated into a number of batches to which varying amounts of the products of Examples 1–5 were added. The pH of the stock at the point of size addition was 5.0. After agitation for 10–15 minutes to obtain a uniform adsorption a sufficient quantity of sodium hydroxide solution was added to raise the pH to 10.0.

The treated stock was made into paper on a laboratory handsheet machine under the usual forming conditions; i. e., at a stock consistency of 0.6% solids. The sheets were couched on a blotter and then placed between two dry blotters and dried by heating for 8 minutes at 240° F.

Samples of the resulting glass fiber paper were tested for water absorption and for water repellency. The water absorption tests were conducted by immersing weighed squares of the paper in water at 73° F. for 5 minutes and noting the percent increases in weight. Water repellency was determined by holding the handsheet at a 15° angle from the horizontal and noting the behavior of a water drop placed on the surface. Sizing tests for water penetration were made on the standard Currier tester using the hard scale. The following table shows the results obtained; in the heading of this table the amount of size is expressed as percent solids based on the dry weight of the glass fiber.

| Sheet No. | Product of Example No. | Amount | Currier | Percent Water Absorption | Behavior of Water Drop |
|---|---|---|---|---|---|
| 1 | 1 | 0.5 | >15 min | 242 | a. |
| 2 |  | 0.75 | do | 229 | a. |
| 3 |  | 1.0 | do | 231 | a. |
| 4 | 2 | 0.5 | 7 min | 392 | b. |
| 5 |  | 1.0 | >15 min | 317 | a. |
| 6 | 3(a) | 0.25 | 5 min | 585 | c. |
| 7 |  | 0.5 | >15 min | 295 | b. |
| 8 | 3(b) | 0.5 | do | 308 | a. |
| 9 |  | 1.0 | do | 203 | a. |
| 10 | 4 | 0.25 | 5 min | 518 | c. |
| 11 | 5 | 0.5 | >15 min | 278 | b. |
| 12 |  | 0.75 | do | 223 | a. |
| 13 |  | 1.00 | do | 144 | a. |
| 14 |  | 2.00 | do | 127 | a. |
| 15 | Control | None | Instantaneous | 2,250 | Instantaneous Absorption. | a = Rolled with no wetting of the paper.
b = Rolled with slight wetting of the paper.
c = Did not roll; contact angle >120°; slight wetting of the paper.

What we claim is:

1. A method of producing a sized waterlaid glass fiber product which comprises preparing a dilute aqueous fiber suspension composed predominantly of glass fibers, adding thereto a small quantity of the water-dispersible condensation product of from 1 to 2 mols of epichlorhydrin with 1 mol of an aliphatic amine of about 8 to 22 carbon atoms, forming the treated fibers into a waterlaid product, and heating the product under alkaline conditions to dry the same and develop the sizing properties of the condensation product thereon.

2. A method according to claim 1 in which the aliphatic amine contains from 16 to 18 carbon atoms.

3. A method of producing a sized waterlaid glass fiber paper which comprises preparing a dilute aqueous fiber suspension composed predominantly of glass fibers, adding thereto a small quantity of the water-dispersible condensation product of 1 to 2 mols of epichlorhydrin with 1 mol of an aliphatic amine of about 8 to 22 carbon atoms, said quantity being sufficient to deposit about 0.1% to 5% of the condensation product on said fibers, forming the treated fibers into paper, and heating the paper under alkaline conditions to dry the same and develop the sizing properties of the condensation product thereon.

4. A method according to claim 3 in which the furnish is made alkaline to a pH of about 8–10 before the paper forming step, and the formed paper is heated under these conditions of alkalinity.

5. A method according to claim 3 in which the condensation product is formed by condensing from 1 to 3 mols of epichlorhydrin with 1 mol of an aliphatic primary amine of about 16 to 18 carbon atoms.

6. A method of producing a sized waterlaid glass fiber product containing a member of the group consisting of starches, gums and hydrocarbon waxes which comprises preparing a dilute aqueous fiber suspension composed predominantly of glass fibers, adding thereto a small quantity of the water-dispersible condensation product of from 1 to 2 mols of epichlorhydrin with 1 mol of an aliphatic amine containing about 8 to 22 carbon atoms, said quantity being such as to deposit about 0.1% to 5% of the condensation product on said fibers, adding to the fibers so treated a quantity of an aqueous dispersion of a member of the group consisting of starches, gums and hydrocarbon waxes sufficient to deposit thereon about 0.1% to 3% of the dry fiber weight thereof, forming the resulting furnish into a waterlaid product, and heating the product in an alkaline condition to dry the same and develop the sizing properties of the condensation product thereon.

7. A method according to claim 6 in which the furnish is made alkaline to a pH of about 8–10 prior to the forming step and the formed product is heated while maintaining this degree of alkalinity thereon.

8. A method according to claim 6 in which the amine is an aliphatic primary amine of about 16 to 18 carbon atoms.

9. Paper composed predominantly of glass fibers sized by an adsorbed content of about 0.1% to 5% of their dry weight of the condensation product of from 1 to 2 mols of epichlorhydrin with 1 mol of an aliphatic amine of about 8 to 22 carbon atoms, said condensation product having been applied to said fibers in aqueous suspension from a water solution of said condensation product in water-dispersible form followed by making the furnish alkaline and forming the treated fibers into paper and heating the paper under alkaline conditions, the paper being heated to a temperature and extent sufficient to dry the same and develop the sizing properties of the condensation product thereon.

10. Paper according to claim 9 wherein the amine used in preparing the condensation product is an aliphatic primary amine of about 16 to 18 carbon atoms.

References Cited in the file of this patent

UNITED STATES PATENTS

| Number | Name | Date |
|---|---|---|
| 1,970,578 | Schoeller et al. | Aug. 21, 1934 |
| 2,338,839 | Coss | Jan. 11, 1944 |
| 2,469,683 | Dudley et al. | May 10, 1949 |
| 2,582,840 | Maxwell | Jan. 15, 1952 |
| 2,601,598 | Daniel et al. | June 24, 1952 |